UNITED STATES PATENT OFFICE.

AUGUSTUS BISCHLER, OF BASEL, SWITZERLAND, ASSIGNOR TO THE FIRM OF BASLE CHEMICAL WORKS, OF BASEL, SWITZERLAND.

CARBAMIC-ACID ESTER AND PROCESS OF MAKING SAME.

No. 839,100. Specification of Letters Patent. Patented Dec. 25, 1906.

Application filed August 9, 1906. Serial No. 329,890.

*To all whom it may concern:*

Be it known that I, AUGUSTUS BISCHLER, a subject of the Emperor of Russia, and a resident of Basel, Switzerland, have invented new Carbamic-Acid Esters of the Pyrogallol-1.3-Dialkyl-Ethers and a Process for the Manufacture of the Same, of which the following is a full, clear, and exact specification.

The pyrogallol-1.3-dialkyl-ethers may easily be oxidized to coerulignone by manifold oxidizing agents and also by bacteria or in the organism. If, however, the hydroxyl-hydrogen atom of the pyrogallol-ethers is replaced by a carbonic-acid radical compounds fast to oxidizing agents are obtained.

Among the carbonic-acid derivatives of the pyrogallol-1.3-dialkyl-ethers the carbamic-acid esters are distinguished by a particularly good antitubercular action when tried upon animals. Indeed, this influence was far more favorable than the antitubercular action of the pyrogallol-ethers themselves.

The carbamic-acid esters of the pyrogallol-1.3-dialkyl-ethers are obtained by treating the pyrogallol-1.3-dialkyl-ethers with chlorid of carbamic acid:

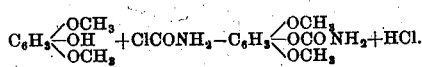

Example: To a solution of one hundred and fifty-four parts pyrogallol-1.3-dimethyl-ether in dry ether an ethereal solution of eighty parts of carbamic-acid chlorid is added while cooling and well stirring. After standing for several hours the separated crystals are filtered off, washed with water, and recrystallized from alcohol. In this manner white needles melting at 148° to 152° centigrade are obtained.

The carbamic-acid ester of pyrogallol-dimethyl-ether melts at 148° to 152° centigrade. On further heating, however, the melt stiffens to a white mass. The carbamic-acid ester is soluble in boiling water to about four per cent. and crystallizes almost quantitatively on the cooling of the solution in the form of colorless needles. It is almost insoluble in ether, slightly soluble in hot benzene, and easily soluble in hot alcohol. By heating with alkalies the carbamic-acid ester is easily split into pyrogallol-dimethyl-ether, dioxid of carbon, and ammonia.

What I claim is—

1. The described process for the manufacture of carbamic-acid esters of pyrogallol-1.3-dialkyl-ethers by treating a pyrogallol-dialkyl-ether with carbamic-acid chlorid.

2. As a new article of manufacture the described carbamic-acid ester of pyrogallol-1.3-dimethyl-ether, which constitutes white to colorless needles melting at 148° to 152° centigrade soluble in boiling water, almost insoluble in ether, slightly soluble in hot benzene and easily soluble in hot alcohol and which is designed to be employed as a remedy against tuberculose.

In witness whereof I have hereunto signed my name, this 27th day of July, 1906, in the presence of two subscribing witnesses

AUGUSTUS BISCHLER.

Witnesses:
GEO. GIFFORD,
AMAND BRAUN.